(12) United States Patent
Gorbunov et al.

(10) Patent No.: US 11,409,397 B1
(45) Date of Patent: Aug. 9, 2022

(54) BIOIMPEDANCE MEASUREMENT BASED INTERFACE FOR CONTROLLING A WEARABLE DEVICE

(71) Applicant: AURA Devices, Inc., Wilmington, DE (US)

(72) Inventors: Stanislav Gorbunov, Moscow (RU); Igor Dorokhin, Saratov (RU); Andrey Boev, Stariy Oskol (RU)

(73) Assignee: AURA DEVICES, INC., Wilmington, DE (US)

( * ) Notice: Subject to any disclaimer, the term of this patent is extended or adjusted under 35 U.S.C. 154(b) by 0 days.

(21) Appl. No.: 17/669,716

(22) Filed: Feb. 11, 2022

(51) Int. Cl.
*G06F 21/32* (2013.01)
*G06F 3/044* (2006.01)

(52) U.S. Cl.
CPC .................. *G06F 3/0445* (2019.05)

(58) Field of Classification Search
CPC .......... G06F 3/044; G06F 3/045; G06F 3/046; G06F 3/047; G06F 3/0446; G06F 21/00; G06F 21/30; G06F 21/31; G06F 21/32; G06F 21/305

See application file for complete search history.

(56) References Cited

U.S. PATENT DOCUMENTS

2016/0154952 A1* 6/2016 Venkatraman .......... G06F 21/35
726/19

* cited by examiner

*Primary Examiner* — Deeprose Subedi
(74) *Attorney, Agent, or Firm* — Georgiy L. Khayet

(57) ABSTRACT

Methods for providing a bioimpedance measurement based interface for controlling a wearable device are provided. An example wearable device includes a strap configured to be worn by a user, an outer electrode located on the outer side of the strap, an inner electrode located on the inner side of the strap and configured to be in permanent contact with the skin of the user, a bioimpedance measurement module configured to measure a differential voltage between the outer electrode and the inner electrode and determine, based on the differential voltage, a bioimpedance signal of the user, and a microcontroller configured to determine that the bioimpedance signal is within a predetermined range, in response to the determination, analyze the bioimpedance signal to determine a pattern of touching the outer electrode by the user, determine that the pattern matches a predetermined pattern, and execute an operation corresponding to the predetermined pattern.

18 Claims, 7 Drawing Sheets

BIOIMPEDANCE MEASUREMENT BASED INTERFACE FOR CONTROLLING A WEARABLE DEVICE

TECHNICAL FIELD

The present disclosure relates generally to wearable devices and, more particularly, to systems and methods for providing bioimpedance measurement based interface for controlling wearable devices.

BACKGROUND

Wearable devices are becoming widely used in many applications, from simple fitness trackers to complex wearable devices for measuring physiological parameters of the body. The user interface is one of the important components of wearable devices. However, currently available interfaces have some drawbacks. The push-button interfaces require too much physical space. The touch-screen interfaces are convenient, but not always easy to use and consume a lot of energy. The interfaces utilizing position sensors may not be sufficiently reliable. Thus, there is a need for improvement of interfaces between users and wearable devices.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for bioimpedance measurement based user interfaces for controlling wearable devices.

According to one example embodiment, a wearable device controlled with a bioimpedance measurement based interface is provided. The wearable device may include a strap configured to be worn by a user. The wearable device may include an outer electrode and an inner electrode. The outer electrode can be located on the outer side of the strap and configured to be touched by the user. The inner electrode can be located on the inner side of the strap and configured to be in permanent contact with the skin of the user while the user wears the strap. The wearable device may include a bioimpedance measurement module embedded into the strap. The bioimpedance measurement module can be configured to measure a differential voltage between the outer electrode and the inner electrode and determine, based on the differential voltage, a bioimpedance signal of the user.

The wearable device may include a microcontroller. The microcontroller can be configured to determine that the bioimpedance signal is within a predetermined range. In response to the determination, the microcontroller can analyze the bioimpedance signal to determine a pattern of touching the outer electrode by the user. The microcontroller can determine that the pattern matches a predetermined pattern. In response to the determination that the pattern matches the predetermined pattern, the microcontroller can execute an operation corresponding to the predetermined pattern.

The determination that the pattern matches the predetermined pattern may include determining a number of events occurring while the user touches the outer electrode for a predetermined time period. The determination that the pattern matches the predetermined pattern may also include determining time differences between the events and durations of the events.

The executing of the operation corresponding to the predetermined pattern may include determining, based on the pattern, an access code, verifying the access code, and, based on the verification, granting access to the wearable device to the user.

The operation corresponding to the predetermined pattern may include switching the wearable device from a first power mode to a second power mode. The operation corresponding to the predetermined pattern may include switching off an alarm of the wearable device. The operation corresponding to the predetermined pattern may include transmitting, by the wearable device, an alarm signal to a designated remote security provider.

The wearable device may include a further outer electrode located on the outer side of the strap and configured to be touched by the user. The bioimpedance measurement module can be configured to measure a further differential voltage between the further outer electrode and the inner electrode and determine, based on the further differential voltage, a further bioimpedance signal of the user. The microcontroller can be configured to determine that the further bioimpedance signal is within the predetermined range. In response to the determination, the microcontroller can analyze the bioimpedance signal and the further bioimpedance signal to determine a combination of first events and second events.

The first events may correspond to first times of the user touching the outer electrode. The second events may correspond to second times of the user touching the further outer electrode. The microcontroller can determine that the combination matches a predetermined combination and, in response to the determination that the combination matches the predetermined combination, execute a further operation corresponding to the predetermined combination. The further operation may include one or more of the following: turning on a function of the wearable device and turning off the function of the wearable device.

According to another example embodiment of the present disclosure, a wearable device is provided. The wearable device may include a strap configured to be worn by a user, the first inner electrode, the second inner electrode, a bioimpedance measurement module embedded into the strap, and a microcontroller. The first inner electrode and the second inner electrode can be located on an inner side of the strap and configured to be in permanent contact with the skin of the user while the user wears the strap. The bioimpedance measurement module can be configured to measure a differential voltage between the first inner electrode and the second inner electrode and determine, based on the differential voltage, a bioimpedance signal of the user. The microcontroller can be configured to track, based on the bioimpedance signal, an alarm signal. The alarm signal may indicate one of the following: an absence of danger or a presence of danger to the user. The microcontroller can be configured to determine that the alarm signal indicates the presence of danger to the user. The microcontroller can be configured to transmit an alarm message to a designated remote security provider in response to the determination.

The tracking of the alarm signal may include determining, based on the bioimpedance signal, a conductivity of the skin of the user, determining that the conductivity of the skin has increased from a first value to a second value during a predetermined period, and, in response to the determination, setting a value of the alarm signal as indicating the presence of danger to the user.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure provides methods and systems for providing bioimpedance measurement based interface for controlling wearable devices. Some embodiments of the present disclosure may allow a wearable device to determine the following information: a value of bioimpedance of a user when the user touches electrodes, how many times the user touches the electrodes and periodicity (rhythm) of touching the electrodes by the user. The wearable device can then perform an operation corresponding to the value of bioimpedance and a specific combination of the number of the touches and the periodicity of touching the electrodes.

Figure 1:
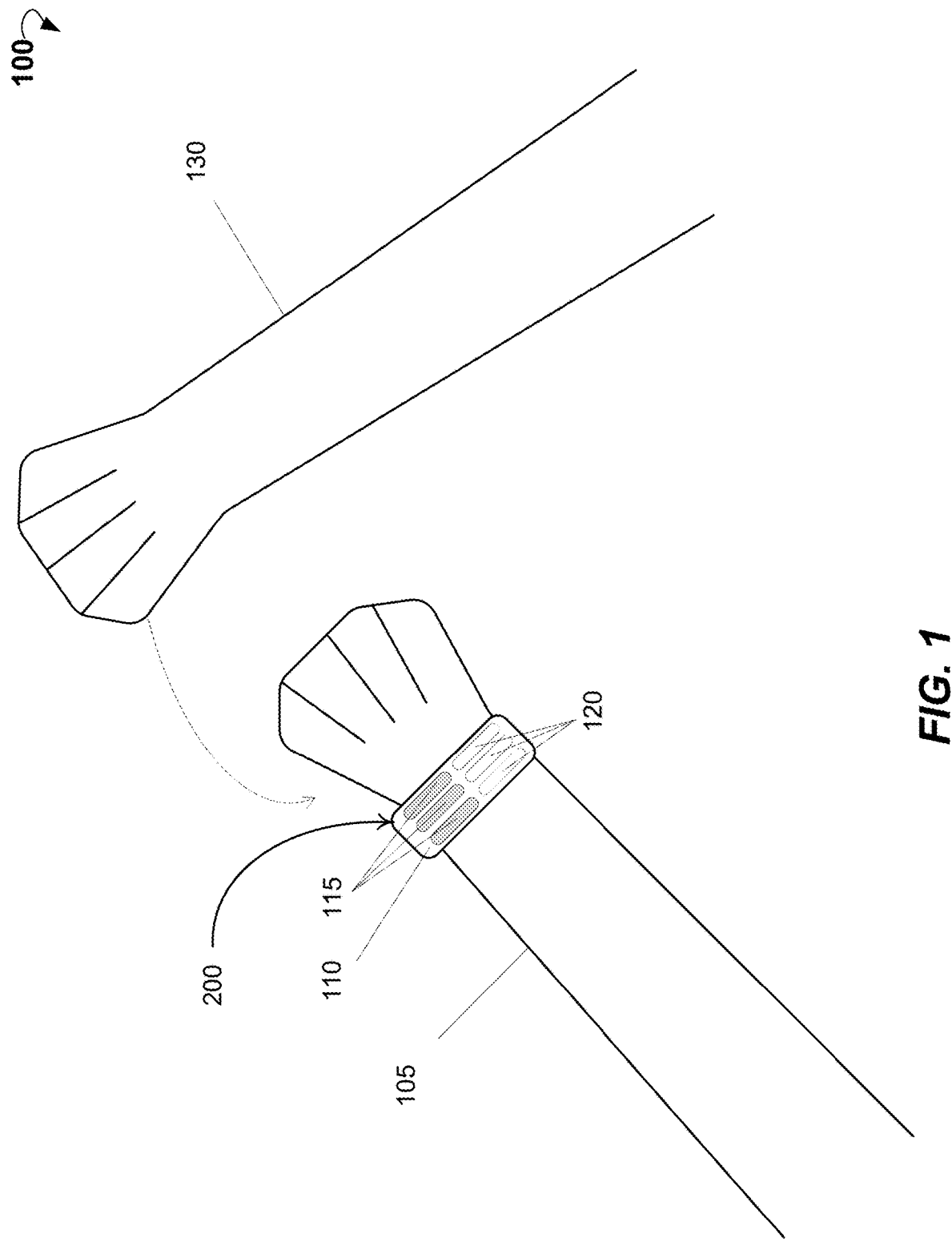
FIG. 1 shows an example environment, in which systems and methods for providing bioimpedance measurement based interface for controlling a wearable device can be implemented, according to some embodiments of the present disclosure.

Referring now to the drawings, FIG. 1 shows an example environment 100 where systems and methods for bioimpedance measurement based interface for controlling a wearable device can be practiced, according to some embodiments of the present disclosure. The environment 100 may include a wearable device 200 including a strap 110 for carrying the wearable device 200 on a wrist of the hand 105 (e.g., the left hand) of a user. The wearable device 200 may include at least one outer electrode 115 located on the outer side of the strap 110 and at least one inner electrode 120 located on the inner side of the strap 110. The inner side of the strap 110 may be the side facing the skin of the user while the user wears the wearable device 200 on the wrist. The outer side of the strap 110 may include the side facing outwards from the wrist and not facing the skin of the user while the user wears the wearable device 200 on the wrist. The inner electrode 120 can be in permanent contact with the skin of the user while the user wears the wearable device 200 on the wrist.

Figure 2:
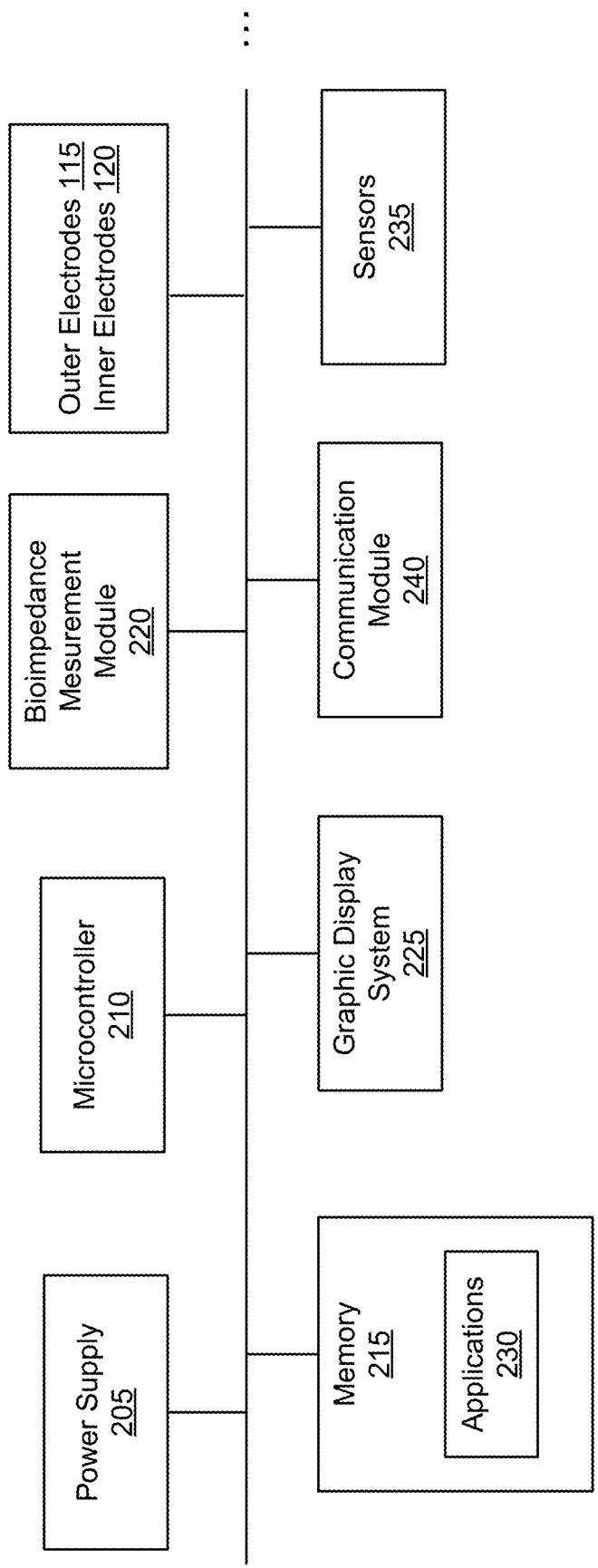
FIG. 2 is a block diagram of a wearable device, according to an example embodiment.

FIG. 2 is a block diagram of the wearable device 200, according to some example embodiments of present disclosure. The wearable device 200 may include a power supply 205, a microcontroller 210 (e.g., a microprocessor), a bioimpedance measurement module 220, one or more outer electrodes 115 (also shown in FIG. 1), one or more inner electrodes 120 (also shown in FIG. 1), a memory 215, a graphic display system 225, sensors 235, and a communication module 240. The memory 215 may store applications 230 of the wearable device 200. The wearable device 200 may also include additional or other components necessary for operations of the wearable device 200. In other embodiments, the wearable device 200 may include fewer components that perform similar or equivalent functions to those depicted in FIG. 6. In various embodiments, the wearable device 200 can be a fitness tracker, a smart watch, a smart bracelet, a specifically designed medical device for collecting physiological parameters of a user, and other similar devices available on the market.

In various embodiments, the communication module 240 may include a wireless radio module configured to receive data using one or more wireless technology standards, including but not limited to a Bluetooth™ standard or Near Field Communication (NFC) standard. The communication module 240 can be used for providing communications between the wearable device 200 and a remote computing device.

Referring back to FIG. 1, the power supply 205 (shown in FIG. 2) can be configured to provide current to the inner electrode 120. Alternatively, the current can be provided to the outer electrode 115. To start interaction with the wearable device 200, the user may touch the outer electrode 115 a predetermined number of times and with predetermined periodicity (rhythm) by hand 130 (e.g., the right hand), and, thereby, close the circuit through the body of the user. Thus, the user touches the wearable device 200 at two areas (points of contacts) of the skin. Having at least two points of contacts and measuring bioimpedance of the user may prevent false positives in determining whether the user touches the wearable device 200. The false positives are common issues in known sensor interfaces.

The bioimpedance measurement module 220 may determine bioimpedance signal B(t) of the user based on voltage difference between the inner electrode 120 and the outer electrode 115. In some embodiments, if the wearable device 200 has several inner electrodes 120 and several outer electrodes 115, the bioimpedance signal B(t) and skin conductivity of the user may be measured between the several inner electrodes 120, as well as measured between the several outer electrodes 115. In some embodiments, the bioimpedance signal B(t) may include both an active component and a reactive component of bioimpedance of the user. In other embodiments, the bioimpedance signal B(t) may include only the active component of the bioimpedance of the user. The bioimpedance measurement module 220 may provide the bioimpedance signal B(t) to the microcontroller 210.

The microcontroller 210 may analyze the bioimpedance signal B(t) to determine a value of the bioimpedance of the user and a pattern of touching the outer electrode 115 by the user. The pattern may be defined as the number of times the user touches the outer electrode 115 during a predetermined period and periodicity (rhythm) of touching. The periodicity (rhythm) can be defined as a combination of time distances between the touches and durations of each touch. The microcontroller 210 may determine that the value of bioimpedance is in a predetermined range and the pattern matches a predetermined pattern associated with an operation of the wearable device 200. In response to the determination, the microcontroller 210 may cause the wearable device 200 to execute the operation associated with the predetermined pattern. In some embodiments, the memory 215 of the wearable device 200 may store one or more predetermined patterns and a list of operations corresponding to the predetermined patterns. The wearable device 200 may include an application (e.g., one of the applications 230) for recording a specific pattern of touching the outer electrode 115 by the user and associating the specific pattern with a specific operation of the wearable device 200.

In some embodiments, the operation performed by the wearable device 200 in response to recognizing one or more patterns of touching the outer electrode by users may include one of the following:
  turning the wearable device 200 on, which is switching the wearable device 200 from a first power mode (for example, a sleep mode, standby mode, and so forth) to a second power mode (for example, a full operational mode);
  entering an access code to authorize access of the user to the functionalities of the wearable device 200. To enter the code, the user may touch the outer electrode a predetermined number of times and with the same or different frequency. This can protect the wearable device 200 and the applications 230 from unauthorized third-party access to the user's bio data stored on the wearable device 200;
  switching of an alarm function of the wearable device 200;
  transmitting, by the wearable device 200 via the communication module 240, a hidden alert message to a designated remote security provider or turning on an external alarm device.

In some embodiments, the wearable device 200 may include two or more outer electrodes 115 on the outer side of the strap 110. In these embodiments, the power supply may provide current to the first outer electrode. The bioimpedance measurement module 220 can measure the bioimpedance signal B(t) based on a voltage difference between the first outer electrode and the second outer electrode. When the user touches a pair of the two or more outer electrodes 115 with their fingers, an electrical circuit closes through the first outer electrode of the pair, the body of the user, and the second outer electrode of the pair. The microcontroller 210 may determine that the electrical circuit is closed by determining that the bioimpedance signal B(t) is within the predetermined range for the bioimpedance of the user. In these embodiments, the user may touch the two or more outer electrodes 115 in a specific manner: simultaneously or in a certain order with a certain periodicity. This may allow to increase the number of options of entering access codes for granting access to different functions and applications 230 of the wearable device 200 and entering options for settings in the applications 230 of the wearable device 200. Two and more outer electrodes 115 can be used as a keyboard or a touchpad.

In certain embodiments, the wearable device 200 may include two and more inner electrodes 120 on the inner side of the strap 110, for example, a first inner electrode and a second inner electrode. In these embodiments, the power supply may provide current to the first inner electrode. The bioimpedance measurement module 220 can measure the bioimpedance signal B(t) based on a voltage difference between the first inner electrode and the second inner electrode. When the user puts the wearable device 200 on, an electrical circuit closes through the first inner electrode, the body of the user, and the second inner electrode. The microcontroller 210 may determine that the electrical circuit is closed by determining that the bioimpedance signal B(t) is within the predetermined range for bioimpedance of the user. The predetermined range can be user specific. Once the microcontroller 210 determines that the electrical circuit is closed, the microcontroller 210 may cause the wearable device 200 to activate. When the user takes the wearable device 200 off, the microcontroller 210 may determine that the bioimpedance signal B(t) is out of the predetermined range and may turn the wearable device 200 off. While being turned on, the wearable device 200 can measure medical parameters of the user using sensors 235 (such as an optical sensor for measuring a heart rate and blood pressure, accelerometers, temperature sensors, and so forth). During the measurements, the microcontroller 210 may continuously check whether the bioimpedance signal B(t) is within the predetermined range to confirm that the user wears the wearable device 200.

In some embodiments, the wearable device 200 may include two and more outer electrodes 115 on the strap 110, for example, a first outer electrode and a second outer electrode. In these embodiments, the first outer electrode can be located on the inner side of strap 110 oriented towards the body of the user (a leg or torso), and the second outer electrode can be located on the outer side of strap 110 oriented away from the body of the user. To close the circuit between the first outer electrode and the second outer electrode, the user can apply the first outer electrode to the body and, simultaneously, touch the second outer electrode with the other hand. Alternatively, the user may touch both the first outer electrode and the second outer electrode by fingers of the other hand. In these embodiments, the power supply may provide current to either the first outer electrode or the second outer electrode.

The microcontroller 210 can determine that the bioimpedance signal B(t) is within the predetermined range and, thereby, determine that the user intentionally closes the circuit. It should be noted that the predetermined range can be different for different users and different ways of touching the outer electrodes (using the body and a hand or using fingers of only one hand). In response to the determination, the microcontroller 210 can perform a designated operation. In some embodiment, the designated operation can be turning the wearable device 200 on. It can be performed safely because the user intentionally closes the circuit. In other embodiment, the designated operation can be transmitting, by the wearable device 200, a hidden alarm signal to a designated remote security provider. This can be used to secretly transmit the alarm signal while avoiding accidental false alarms. In further embodiments, the wearable device 200 may include more than two outer electrodes. This may increase options for touching different pairs of outer electrodes and for different ways of touching, and, thereby, increase the number of possible commands that the wearable device 200 may perform in response to touching different pairs of outer electrodes and different ways of touching (with the body, hand, or with fingers of one hand only).

Figure 3:
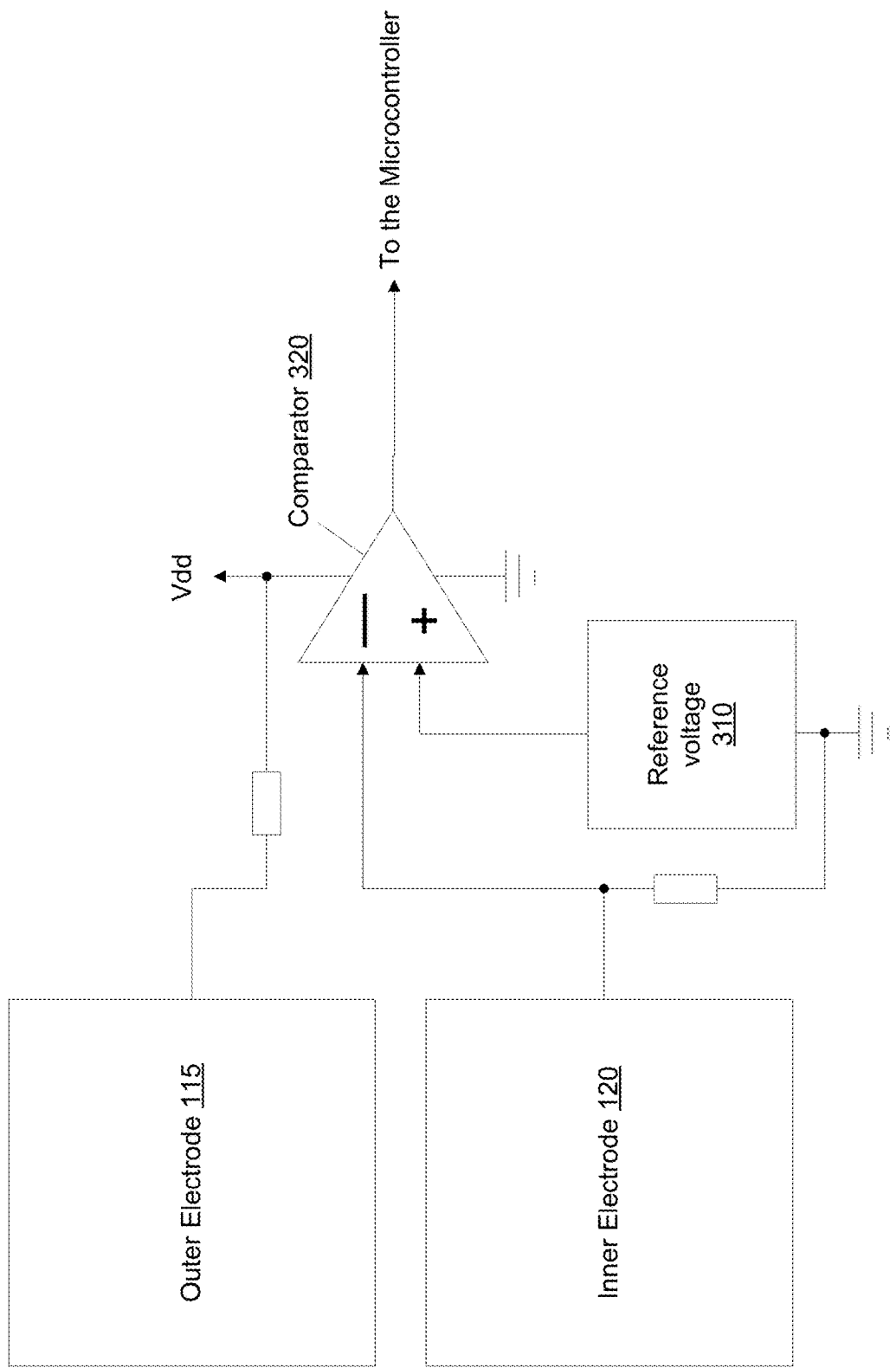
FIG. 3 shows a scheme for implementing a bioimpedance measurement based interface for controlling wearable devices, according to an example embodiment.

FIG. 3 shows a scheme 300 for implementing bioimpedance measurement based interface for controlling wearable devices, according to an example embodiment. The scheme 300 may be suitable for wearable devices having limited power supply, where minimizing power consumption is an important issue. The scheme 300 can be used for providing minimal interface: turning the wearable device on/off and entering a simple code by touching one outer electrode in a predetermined manner.

The scheme 300 includes an inner electrode 120, an outer electrode 115, a reference voltage 310, and a comparator 320. The circuit of the scheme 300 can measure only the active components of bioimpedance. Generally, the circuit of the scheme 300 is a device that switches the output of the comparator 320 from a logical one to a logical zero when the resistance between the electrodes is not infinite.

Figure 4:
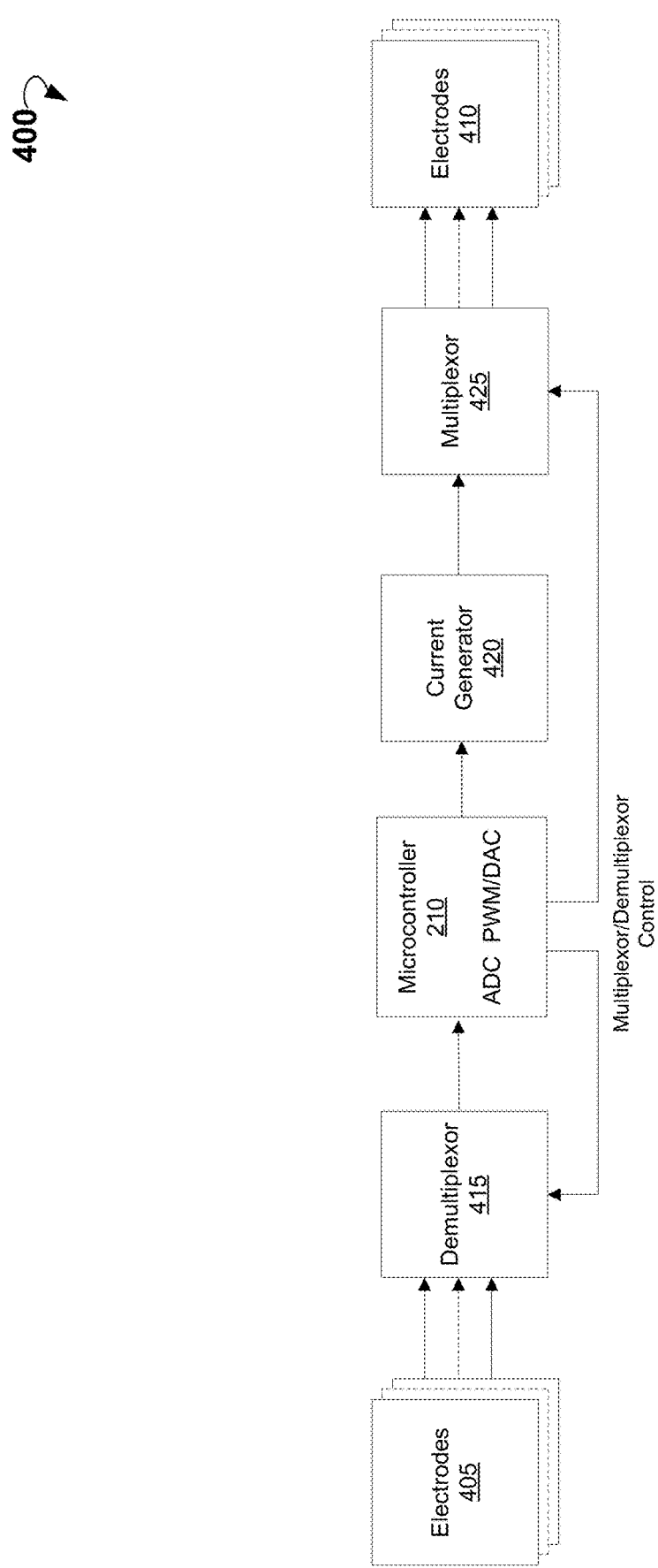
FIG. 4 shows a scheme for implementing a bioimpedance measurement based interface for controlling wearable devices, according to another example embodiment.

FIG. 4 shows a scheme 400 for implementing bioimpedance measurement based interface for controlling wearable devices, according to another example embodiment. The scheme 400 can be suitable for wearable devices, where accuracy of measurement of the bioimpedance is not required and the microcontroller has enough resources and logic to perform bioimpedance measurements internally without an external bioimpedance measurement module.

The scheme 400 may include one or more current electrodes 410 to deliver electrical current to a tissue of a user, one or more voltage electrodes 405 for sensing voltage on the tissue of the user, a demultiplexer 415, a microcontroller 210, a current generator 420, and a multiplexer 425. Each of the current electrodes 410 and voltage electrodes 405 can be located either on the inner side of the strap 110 of the wearable device 200 or the outer side of the strap 110 of the wearable device 200 depending on the design and functions of the interface. The microcontroller 210 may include analog-to-digital converter (ADC), pulse width modulator (PWM), and digital-to-analog converter (DAC).

The scheme 400 may measure the resistance between the voltage electrodes 405 and the current electrodes 410. PWM and DAC can be used to generate excitation current in the form of a sine wave to make it possible to measure both an active component and a reactive component of bioimpedance of the user. The value of the measured resistance can be used as a criterion for activating the interface. Connecting the multiplexer 425 to the output of the current generator 420 and the demultiplexer 415 to the input of the ADC may allow having multiple electrodes in the wearable device 200 and allow the microcontroller 210 to analyze the voltage difference and bioimpedance signal from different pairs of electrodes.

Figure 5:
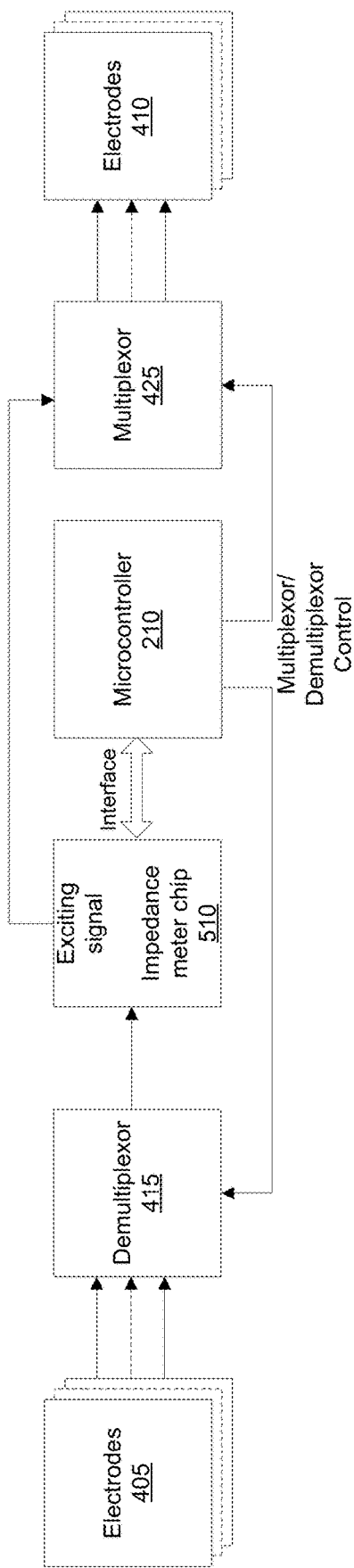
FIG. 5 shows a scheme for implementing a bioimpedance measurement based interface for controlling wearable devices, according to yet another example embodiment.

FIG. 5 shows a scheme 500 for implementing the bioimpedance measurement based interface for controlling wearable devices, according to yet another example embodiment. The scheme 500 can be suitable for wearable devices, where it is required to measure both an active component and a reactive component of bioimpedance at a predetermined level of accuracy. Additionally, the scheme 500 can be suitable for wearable devices, where the microcontroller does not have enough resources or logic to perform bioimpedance measurements internally without an external bioimpedance measurement module.

The scheme 500 may include one or more current electrodes 410 to deliver electrical current to a tissue of a user, one or more voltage electrodes 405 for sensing voltage on the tissue of the user, a demultiplexer 415, a microcontroller 210, a bioimpedance meter chip 510 as bioimpedance measurement module, and a multiplexer 425. Each of the current electrodes 410 and voltage electrodes 405 can be located either on the inner side of the strap 110 of the wearable device 200 or the outer side of the strap 110 of the wearable device 200, depending on the design and functions of the interface.

The multiplexer 425 can be connected to the output of the excitation signal of the impedance meter chip 510. The demultiplexer 415 can be connected to the input of the impedance meter chip 510. This arrangement may allow using the impedance meter chip 510 with multiple electrodes. The microcontroller 210 may control the multiplexer 425 and the demultiplexer 415 to switch the electrical signal between different pairs of electrodes.

Figure 6:
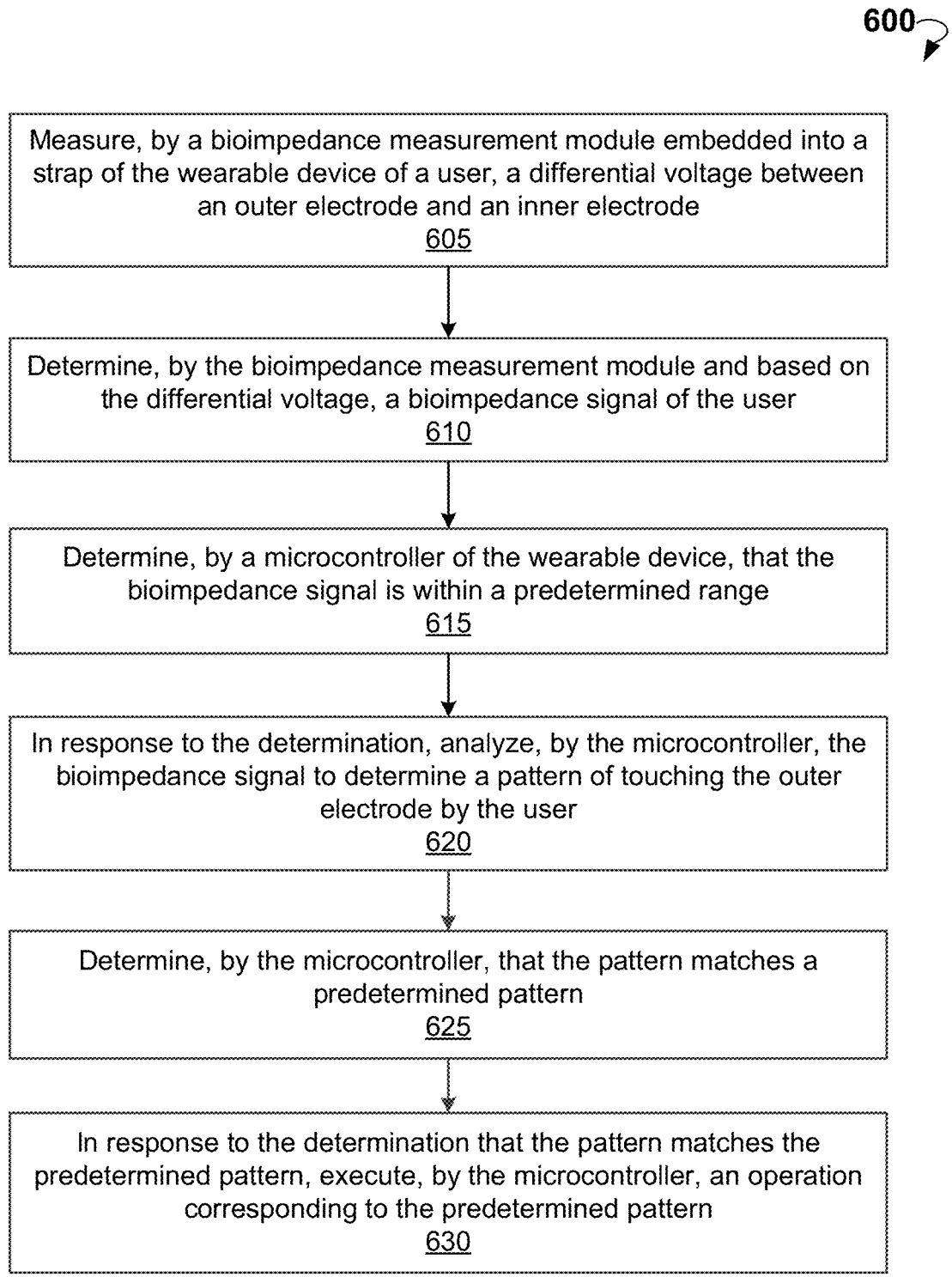
FIG. 6 is a flow chart of an example method for providing bioimpedance measurement based interface for controlling wearable devices, according to some example embodiments.

FIG. 6 is a flow chart of a method 600 for providing bioimpedance measurement based interface for controlling wearable devices, according to some example embodiments. The steps of the method 600 recited below may be implemented in order other than described and shown in the FIG. 6. Moreover, the method 600 may have additional steps not shown herein, but which can be evident to those skilled in the art from the present disclosure.

The method 600 may commence in block 605 with measuring, by a bioimpedance measurement module embedded into the strap of the wearable device of a user, a differential voltage between an outer electrode and an inner electrode. The strap can be configured to be worn by the user. The outer electrode can be located on the outer side of the strap and configured to be touched by the user. The inner electrode can be located on the inner side of the strap and configured to be in permanent contact with the skin of the user while the user wears the strap.

In block 610, the method 600 may include determining, by the bioimpedance measurement module and based on the differential voltage, a bioimpedance signal of the user. In block 615, the method 600 may include determining, by a microcontroller, that the bioimpedance signal is within a predetermined range. In block 620, the method 600 may include analyzing, by the microcontroller, in response to the determination, the bioimpedance signal to determine a pattern of touching the outer electrode by the user. The determination of the pattern may include determining a number of events occurring while the user touches the outer electrode for a predetermined period. The determination that the pattern matches the predetermined pattern may include determining time differences between the events and durations of the events.

In block 625, the method 600 may include determining, by the microcontroller, that the pattern matches a predetermined pattern. In block 630, the method 600 may include, executing, by the microcontroller, in response to the determination that the pattern matches the predetermined pattern, an operation corresponding to the predetermined pattern.

The execution operation corresponding to the predetermined pattern may include determining, based on the pattern, an access code, verifying the access code, and, based on the verification, granting access to the wearable device to the user. The operation corresponding to the predetermined pattern may include switching the wearable device from a low power mode to a normal power mode. The operation corresponding to the predetermined pattern may include switching off an alarm of the wearable device. The operation corresponding to the predetermined pattern may include transmitting, by the wearable device, an alarm signal to a designated remote security provider.

In some embodiments, the method 600 may further include measuring, by the bioimpedance measurement module, a further differential voltage between a further outer electrode and the inner electrode. The further outer electrode can be located on the outer side of the strap and configured to be touched by the user. The method 600 may include determining, by the bioimpedance measurement module and based on the further differential voltage, a further bioimpedance signal of the user. The method 600 may include determining, by the microcontroller, that the further bioimpedance signal is within the predetermined range. In response to the determination, the method 600 may include analyzing, by the microcontroller, the bioimpedance signal and the further bioimpedance signal to determine a combination of first events and second events. The first events may correspond to first times of the user touching the outer electrode. The second events may correspond to second times of the user touching the further outer electrode. The method 600 may include determining, by the microcontroller, that the combination matches a predetermined combination. In response to the determination that the combination matches the predetermined combination, the method 600 may proceed with executing a further operation corresponding to the predetermined combination. The further operation may include one of the following: turning on a function of the wearable device and turning off the function of the wearable device.

Figure 7:
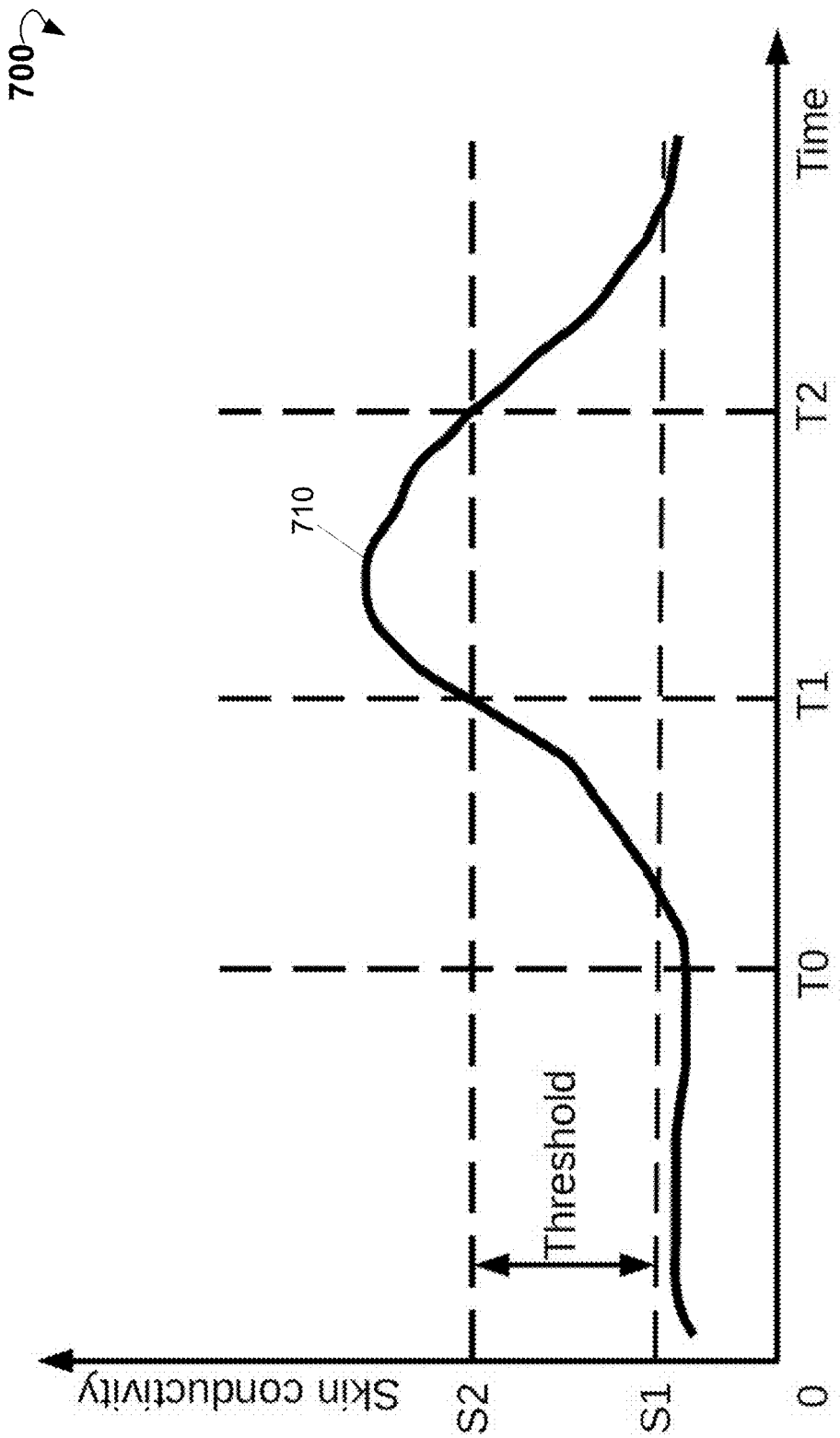
FIG. 7 shows an example plot of skin conductivity of a user.

FIG. 7 shows an example plot 700 of skin conductivity 710 of a user. The skin conductivity 710 can be determined based on bioimpedance signal B(t). The skin conductivity 710 can be used to determine whether the user is currently stressed or frightened. When the user is in their normal state, the skin conductivity 710 changes slightly and slowly. For example, when the user is in their normal state, the skin conductivity 710 remains under a predetermined limit S1. At time T0 corresponding to the moment of fright, skin conductivity 710 starts increasing sharply after a short delay. For example, if the change of the skin conductivity increases from S1 to S2 during a certain period T2-T1, where S2 is a predetermined threshold, it may be concluded that the user is in danger at the time T1.

As described above, in some embodiments, the wearable device 200 (shown in FIG. 2) may include two and more inner electrodes on the inner side of the strap 110 (shown in FIG. 1), for example, a first inner electrode and a second inner electrode. In these embodiments, the power supply may provide current to the first inner electrode. The bioimpedance measurement module 220 (shown in FIG. 2) can measure the bioimpedance signal B(t) based on a voltage difference between the first inner electrode and the second inner electrode. The microcontroller 210 (shown in FIG. 2) may be configured to constantly track value of the skin conductivity 710 based on the bioimpedance signal B(t).

The microcontroller 210 may determine that the skin conductivity 710 has increased from S1 to S2 during the certain period T2-T1. In response to the determination that the skin conductivity 710 has increased, the microcontroller 210 may send, via the communication module 240 (shown in FIG. 2), an alert message to an external computing device of a designated remote security provider or turn on an external alarm device. Additionally, the microcontroller 210 may store a portion of values of the skin conductivity 710 corresponding to stress condition (for example, values of the skin conductivity 710 between T1 and T2) to the memory 215 (shown in FIG. 2) of the wearable device 200. The microcontroller 210 may send the portion of values of the skin conductivity 710 corresponding to stress condition to the external computing device or an external data storage.

In some embodiments, the microcontroller 210 may constantly generate and track an alarm signal A(t) based on the skin conductivity 710. The alarm signal A(t) may have two values: "absence of danger" and "presence of danger". The alarm signal A(t) is equal to "absence of danger" when the skin conductivity 710 changes slightly and slowly, that is the skin conductivity 710 remains under the predetermined limit S1. The alarm signal A(t) is equal to "presence of danger" when the skin conductivity 710 changes rapidly from the predetermined limit S1 to the predetermined limit S2 during the certain period T2-T1. The microcontroller 210 may store the alarm signal A(t) in the memory 215 of the wearable device 200 or an external data storage. The microcontroller 210 may send the alarm signal A(t) to an external computing device of a designated remote security provider. The microcontroller 210 may turn on or off an external alarm device based on the values of the alarm signal A(t).

In some embodiments, the wearable device 200 includes an outer electrode in addition to the first inner electrode and the second inner electrode on the outer side of the strap 110. In these embodiments, the user may touch the outer electrode with a predetermined pattern corresponding to an operation. The operation may include sending an alarm message to the designated remote security provider. In some embodiments, the microcontroller 210 may determine whether to send the alarm message based on the current value of the alarm signal A(t). For example, the microcontroller 210 may send the alarm message only if the value of the alarm signal A(t) is "presence of danger" at the time the user touches the outer electrode with the predetermined pattern.

In other embodiments, the microcontroller 210 can send both the current value of the alarm signal A(t) and the alarm message to an external computing device of the designated remote security provider, so the external computing device can decide whether the user is in danger or not.

Thus, systems and methods for providing bioimpedance measurement based interface for controlling wearable devices are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:
1. A wearable device comprising:
a strap configured to be worn by a user;
an outer electrode located on an outer side of the strap and configured to be touched by the user;
an inner electrode located on an inner side of the strap and configured to be in permanent contact with skin of the user while the user wears the strap;
a bioimpedance measurement module embedded into the strap and configured to:
measure a differential voltage between the outer electrode and the inner electrode; and determine, based on the differential voltage, a bioimpedance signal of the user; and a microcontroller configured to:
- determine that the bioimpedance signal is within a predetermined range;
- in response to the determination, analyze the bioimpedance signal to determine a pattern of touching the outer electrode by the user;
- determine that the pattern matches a predetermined pattern; and
- in response to the determination that the pattern matches the predetermined pattern, execute an operation corresponding to the predetermined pattern, wherein the operation corresponding to the predetermined pattern includes switching the wearable device from a first power mode to a second power mode.

2. The wearable device of claim 1, wherein the determining that the pattern matches the predetermined pattern includes determining a number of events occurring while the user touches the outer electrode for a predetermined time period.

3. The wearable device of claim 2, wherein the determining that the pattern matches the predetermined pattern includes determining time differences between the events and durations of the events.

4. The wearable device of claim 1, wherein the executing the operation corresponding to the predetermined pattern includes:
- determining, based on the pattern, an access code;
- verifying the access code; and
- based on the verification, granting access to the wearable device to the user.

5. The wearable device of claim 1, wherein the operation corresponding to the predetermined pattern includes switching off an alarm of the wearable device.

6. The wearable device of claim 1, wherein the operation corresponding to the predetermined pattern includes transmitting, by the wearable device, an alarm signal to a designated remote security provider.

7. The wearable device of claim 1, further comprising a further outer electrode located on the outer side of the strap and configured to be touched by the user, wherein:
the bioimpedance measurement module is configured to:
- measure a further differential voltage between the further outer electrode and the inner electrode; and
- determine, based on the further differential voltage, a further bioimpedance signal of the user; and the microcontroller configured to:
- determine that the further bioimpedance signal is within the predetermined range; and
- in response to the determination, analyze the bioimpedance signal and the further bioimpedance signal to determine a combination of first events and second events, the first events corresponding to first times of the user touching the outer electrode and the second events corresponding to second times of the user touching the further outer electrode;
- determine that the combination matches a predetermined combination; and
- in response to the determination that the combination matches the predetermined combination, executing a further operation corresponding to the predetermined combination.

8. The wearable device of claim 7, wherein the further operation includes one of the following:
- turning on a function of the wearable device; and
- turning off the function of the wearable device.

9. A method for providing an interface of a wearable device, the method comprising:
- measuring, by a bioimpedance measurement module embedded into a strap of the wearable device of a user, a differential voltage between an outer electrode and an inner electrode, the strap being configured to be worn by the user, the outer electrode being located on an outer side of the strap and configured to be touched by the user, the inner electrode being located on an inner side of the strap and configured to be in permanent contact with skin of the user while the user wears the strap;
- determining, by the bioimpedance measurement module and based on the differential voltage, a bioimpedance signal of the user;
- determining, by a microcontroller, that the bioimpedance signal is within a predetermined range;
- in response to the determination, analyzing, by the microcontroller, the bioimpedance signal to determine a pattern of touching the outer electrode by the user;
- determining, by the microcontroller, that the pattern matches a predetermined pattern; and
- in response to the determination that the pattern matches the predetermined pattern, executing, by the microcontroller, an operation corresponding to the predetermined pattern, wherein the operation corresponding to the predetermined pattern includes switching the wearable device from a low power mode to a normal power mode.

10. The method of claim 9, wherein the determining the pattern includes determining a number of events occurring while the user touches the outer electrode for a predetermined period.

11. The method of claim 10, wherein the determining that the pattern matches the predetermined pattern includes determining time differences between the events and durations of the events.

12. The method of claim 9, wherein the executing the operation corresponding to the predetermined pattern includes:
- determining, based on the pattern, an access code;
- verifying the access code; and
- based on the verification, granting access to the wearable device to the user.

13. The method of claim 9, wherein the operation corresponding to the predetermined pattern includes switching off an alarm of the wearable device.

14. The method of claim 9, wherein the operation corresponding to the predetermined pattern includes transmitting, by the wearable device, an alarm signal to a designated remote security provider.

15. The method of claim 9, further comprising:
- measuring, by the bioimpedance measurement module, a further differential voltage between a further outer electrode and the inner electrode, the further outer electrode being located on the outer side of the strap and configured to be touched by the user;
- determining, by the bioimpedance measurement module and based on the further differential voltage, a further bioimpedance signal of the user;
- determining, by the microcontroller, that the further bioimpedance signal is within the predetermined range; and in response to the determination, analyzing, by the microcontroller, the bioimpedance signal and the further bioimpedance signal to determine a combination of first events and second events, the first events corresponding to first times of the user touching the outer electrode and the second events corresponding to second times of the user touching the further outer electrode;

determining, by the microcontroller, that the combination matches a predetermined combination; and in response to the determination that the combination matches the predetermined combination, executing a further operation corresponding to the predetermined combination.

16. The method of claim 15, wherein the further operation includes one of the following:

turning on a function of the wearable device; and turning off the function of the wearable device.

17. A wearable device comprising:

a strap configured to be worn by a user;

a first inner electrode located on an inner side of the strap and configured to be in permanent contact with skin of the user while the user wears the strap;

a second inner electrode located on the inner side of the strap and configured to be in permanent contact with the skin of the user when the user wears the strap;

a bioimpedance measurement module embedded into the strap and configured to:

measure a differential voltage between the first inner electrode and the second inner electrode; and determine, based on differential voltage, a bioimpedance signal of the user; and a microcontroller configured to:

track, based on the bioimpedance signal, an alarm signal indicating one of the following: an absence of danger or a presence of danger to the user;

determine that the alarm signal indicates the presence of danger to the user; and in response to the determination, transmit an alarm message to a designated remote security provider.

18. The wearable device of claim 17, wherein the tracking the alarm signal includes:

determining, based on the bioimpedance signal, a conductivity of the skin of the user;

determining that the conductivity of the skin has increased from a first value to a second value during a predetermined period; and in response to the determination, setting a value of the alarm signal as indicating the presence of danger to the user.

* * * * *